(12) United States Patent
Lang

(10) Patent No.: US 6,704,740 B1
(45) Date of Patent: Mar. 9, 2004

(54) METHOD FOR ANALYZING PRODUCT PERFORMANCE DATA

(75) Inventor: Theodore James Lang, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 293 days.

(21) Appl. No.: 09/635,970

(22) Filed: Aug. 10, 2000

(51) Int. Cl.[7] .............................................. G06F 17/30
(52) U.S. Cl. ............................... 707/102; 707/2; 707/4; 707/104.1
(58) Field of Search .......................... 707/102, 2, 3–4, 707/10, 100, 104.1

(56) References Cited

U.S. PATENT DOCUMENTS

| | | | | |
|---|---|---|---|---|
| 5,918,225 A | * | 6/1999 | White et al. ................... | 707/1 |
| 6,012,058 A | * | 1/2000 | Fayyad et al. .................. | 707/6 |
| 6,169,985 B1 | * | 1/2001 | Almgren et al. ............ | 345/968 |
| 6,189,004 B1 | * | 2/2001 | Rassen et al. ............... | 707/102 |
| 6,385,604 B1 | * | 5/2002 | Bakalash et al. ............... | 707/3 |
| 6,434,544 B1 | * | 8/2002 | Bakalash et al. ............... | 707/2 |
| 6,480,842 B1 | * | 11/2002 | Agassi et al. ................... | 707/4 |
| 6,549,907 B1 | * | 4/2003 | Fayyad et al. ............... | 707/101 |
| 6,581,054 B1 | * | 6/2003 | Bogrett ........................... | 707/4 |

OTHER PUBLICATIONS

Website having the address of: http://naade02.msfc.nasa.gov/workforce/ . (Jul. 14, 2000) "About The NASA Workforce Data", 4 pages.

* cited by examiner

Primary Examiner—Greta Robinson
Assistant Examiner—Debbie M. Le
(74) Attorney, Agent, or Firm—David B. Kelley

(57) ABSTRACT

A method for analyzing product performance relational data is disclosed. The method includes selecting a database query from a set of preselected database queries by choosing a plurality of predefined relational database fields containing the product performance relational data, and displaying a result of the database query derived from a pre-processed set of database queries.

16 Claims, 7 Drawing Sheets

METHOD FOR ANALYZING PRODUCT PERFORMANCE DATA

TECHNICAL FIELD

The present invention relates to methods for processing, analyzing, and displaying product performance data, such as quality data, market research data, customer concern data, and the like.

BACKGROUND ART

Product research analysts have used product performance data such as warranty data, market research data, product concern data and other quality data for many years to determine how a product is performing in the field. For example, customer concerns are analyzed by measuring things gone wrong per one thousand vehicles. Typically, the things gone wrong data and other market research data are stored in large relational databases for later retrieval and analysis by the product research analysts.

In prior art methods for analyzing product performance data, the product research analyst must know which queries to run, what to expect from these queries, and must procedurally chart their results to obtain an analysis that will be used to determine follow-up queries. Significant processing time is consumed by the computer to select, summarize, and sort the results. Thus, the current methods create a discontinuity of thought further slowing the product performance data analysis.

Therefore, a need exists for a new and improved method for analyzing product information data which overcomes the shortcomings outlined above. For example, the new and improved method must provide real time processing of user queries so as to maintain a continuity of thought.

DISCLOSURE OF INVENTION

In accordance with the present invention, a method for analyzing product performance relational data is provided. The method includes selecting a database query from a set of preselected database queries by choosing a plurality of predefined database fields containing the product performance relational data, and displaying a result of the database query derived from a pre-processed set of database queries.

In accordance with another aspect of the present invention, the pre-processed set of database queries is an online analytical processing data cube.

In accordance with another aspect of the present invention, displaying a result further comprising displaying a graphical user interface for providing a user with a means to analyze the product performance relational data.

In accordance with another aspect of the present invention, the result of the database query is displayed via an Internet website.

In accordance with still another aspect of the present invention, the product performance relational data is warranty data.

In accordance with still another aspect of the present invention, the product performance relational data is market research data.

In accordance with still another aspect of the present invention, the product performance relational data is product concern data.

In accordance with still another aspect of the present invention, the product performance relational data is product quality data.

In accordance with yet another aspect of the present invention, a method for analyzing product performance relational data is provided. The method includes selecting a database query from a set of preselected database queries by choosing a plurality of predefined database fields containing the product performance relational data, and displaying a result of the database query derived from an online analytical processing data cube.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
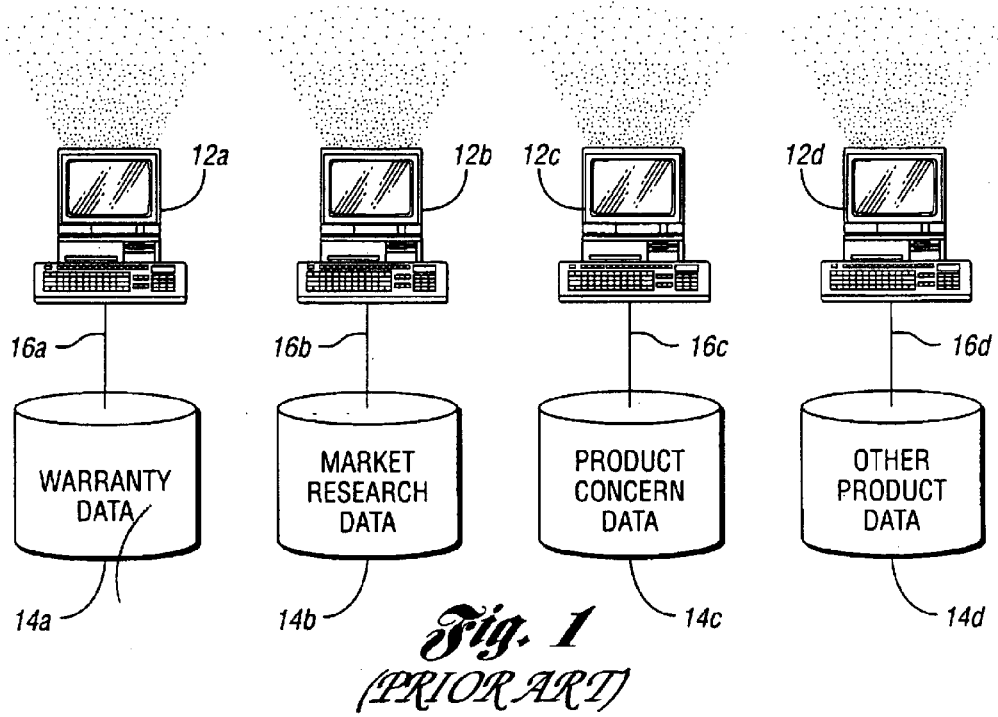
FIG. 1 is a diagrammatic representation of a prior art system and method for analyzing product performance data.

Reference is now made to FIG. 1 which is a diagrammatic representation of a typical prior art system and method for analyzing product performance data. Typically, the prior art system and method 10 includes a plurality of discrete product analysis tools 12a–12d. The product analysis tools are software applications which utilize the product performance data stored in a plurality of discrete relational databases 14a–14d and provide product performance analysts with the ability to create and run database queries, using various application software.

Generally, the product analysis tools access databases 14a–14d via communications networks 16a–16d such as an Ethernet. The product information stored in the product information databases 14a–14d typically, includes warranty data, market research data, product concern research data, and other quality data. Things gone wrong per one thousand vehicles is one example of the product performance data stored in the product performance databases.

One major disadvantage of the prior art system shown in FIG. 1 is that each of the analysis tools 12a–12d are separate and discrete software applications which have dissimilar interfaces. The dissimilar interfaces in many cases prevents a user from accessing the different databases 14a–14d and thus the information stored therein. Further, the prior art analysis tools 12a–12d requires a user to know which queries to run, what to expect from the queries, and then the user must chart their results to obtain the analysis that will determine follow-up queries. Moreover, when a product performance analyst desires to modify a database query he must resubmit the query and then analyze the latest results obtained which is time consuming and causes a discontinuity of thought.

Figure 2:
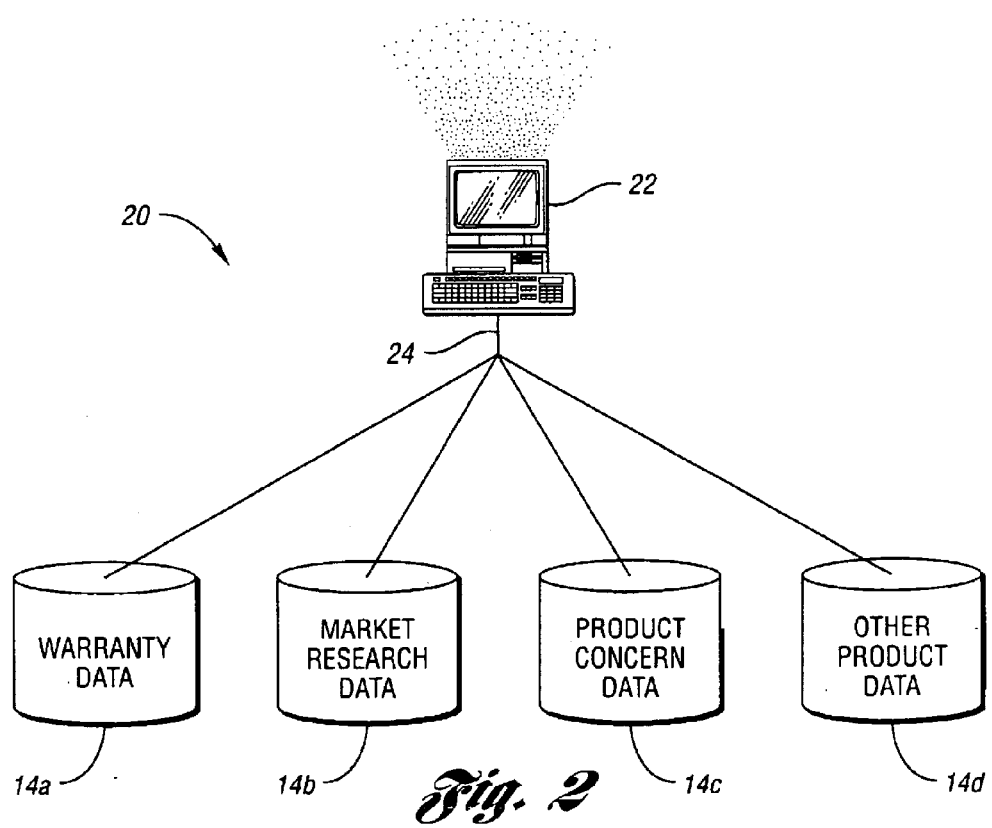
FIG. 2 is a diagrammatic representation of a new and improved system and method for analyzing product performance data, in accordance with the present invention.

In accordance with the present invention a new and improved system and method 20 for analyzing product performance data is diagrammatically illustrated, in FIG. 2. The new and improved system and method 20 for analyzing product information data utilizes a plurality of product performance relational databases 14a–14d via a single analysis interface tool 22. Analysis interface tool 22 allows a user to access the plurality of product performance databases 14a–14d through communications network 24. Preferably, analysis interface tool 22 utilizes analysis software offered by Cognos Incorporated of Ottawa, ON Canada.

Accordingly, since a single analysis tool interface is used to access and analyze product information stored in the transformed databases (cubes) 14 a user may quickly and easily interact with the different types of product performance data without having to learn a new analysis interface tool, as was the case in the prior art.

Analysis interface tool 22 has improved performance over prior art systems and methods because it pre-processes the database queries. This allows the user to follow-up immediately with the next query, quickly or instantaneously, without losing his train of thought.

Figure 3:
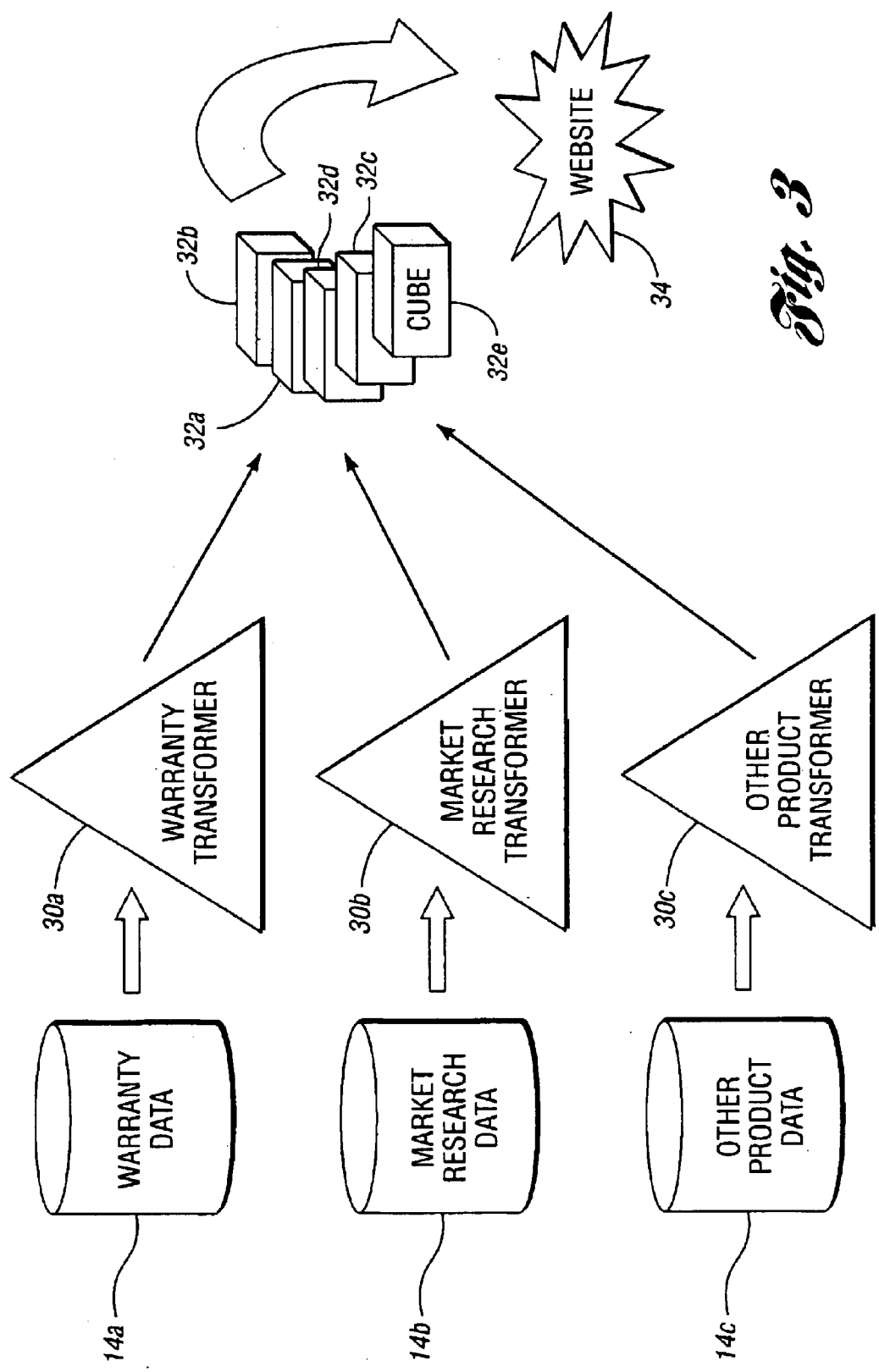
FIG. 3 is a diagrammatic representation of the process for creating the analysis cube for the product performance data, in accordance with the present invention.

Referring now to FIG. 3, the process for analyzing product performance data is illustrated in further detail, in accordance with the present invention. The first step in the process is to retrieve a specific set of product performance relational database fields from the databases 14a–14c. The specific set of relational database fields are used to create a transformer model 30a–30c. The transformer model 30a–30c defines a discrete series of database queries to be processed. A transformed database cube is created for each set of product performance data such as warranty data, customer concern data, market research data and the like.

Once the transformer models 30a–30c are created the system processes the transformer models and the result is a plurality of multi-dimensional database structures which are referred to as on-line analytical processing or data cubes 32a–32e. The data cubes store the results of the queries on the product performance data and provide quick retrieval and manipulation of same. These data cubes are available for display and analysis by the end user (product performance analysts) through preferably an Internet website 34.

Figure 4:
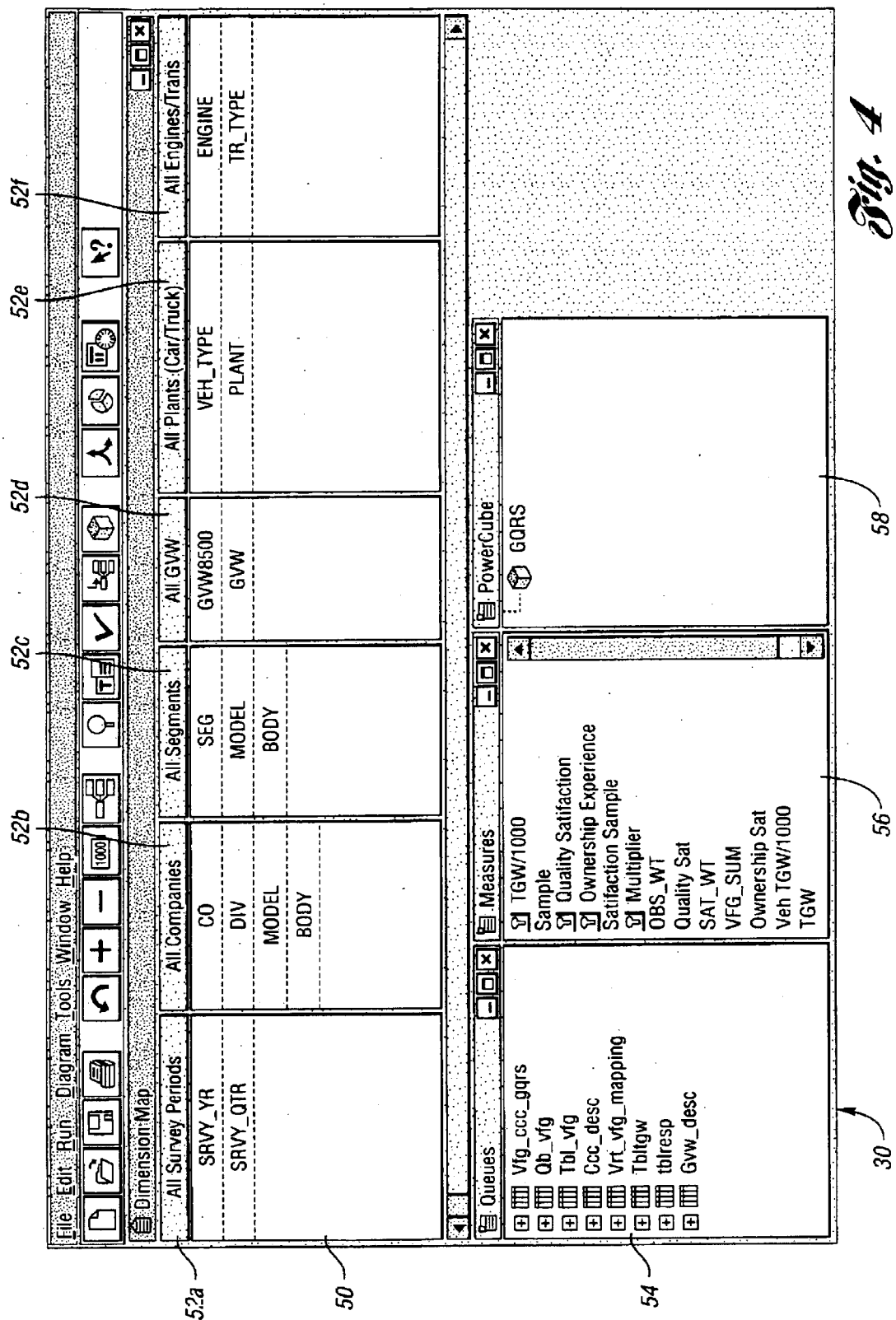
FIG. 4 is a diagrammatic representation of the product performance transformer, in accordance with the present invention.

The transformer model 30, in accordance with the present invention is further illustrated in FIG. 4. As shown a dimension map window 50 is provided for building the relational database queries. The window 50 is comprised of a series of relational database fields selected from the product performance relational databases 14. The fields 52a–52f in the automotive product quality analysis context, for example, may include market survey period, automotive company, vehicle segment such as small car, large car, model and body, gross vehicle weight, assembly plants and vehicle power train.

Additional fields may be added by selecting a relational database field from the queries window 54 and/or the measures window 56. Queries window 54 includes a series of database queries which are defined in each of the product performance databases 14. The measures window 56 includes a plurality of product performance data including calculations derived from market research, warranty data, product concern research and other quality information.

Once the product information transformer model is created and the transformer model is processed, the results of the processed transformer are stored in the data cube 32 as shown in window 58. The data cube, as previously described, is a multi-dimensional database structure which stores the results of the queries created during the execution of the transformer model.

Figure 5A:
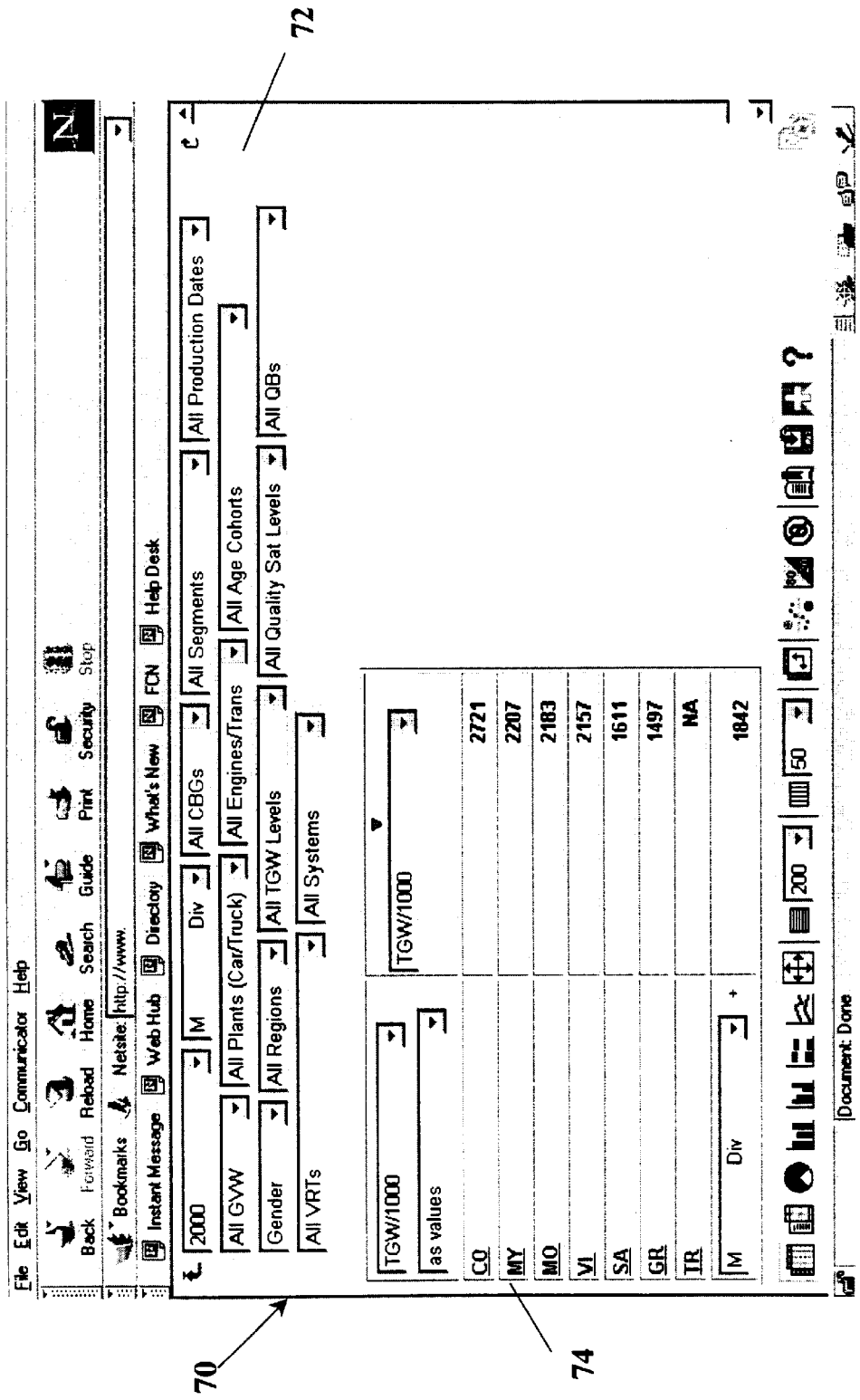
FIGS. 5a, 5b, 5c, and 5d are a diagrammatic representation of a graphical user interface for displaying the database query results stored in the data cubes, in accordance with the present invention.
Figure 5B:
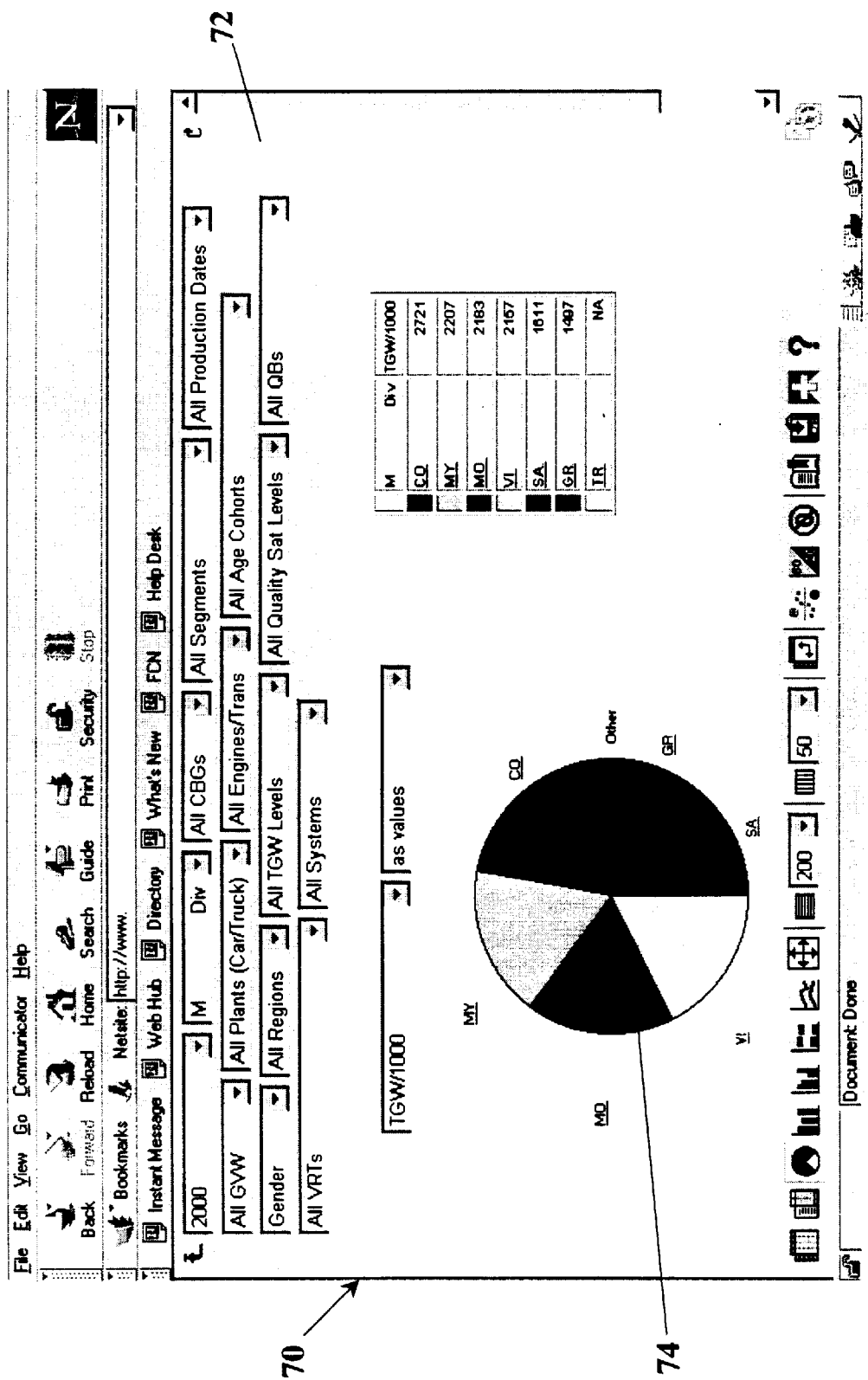
Figure 5C:
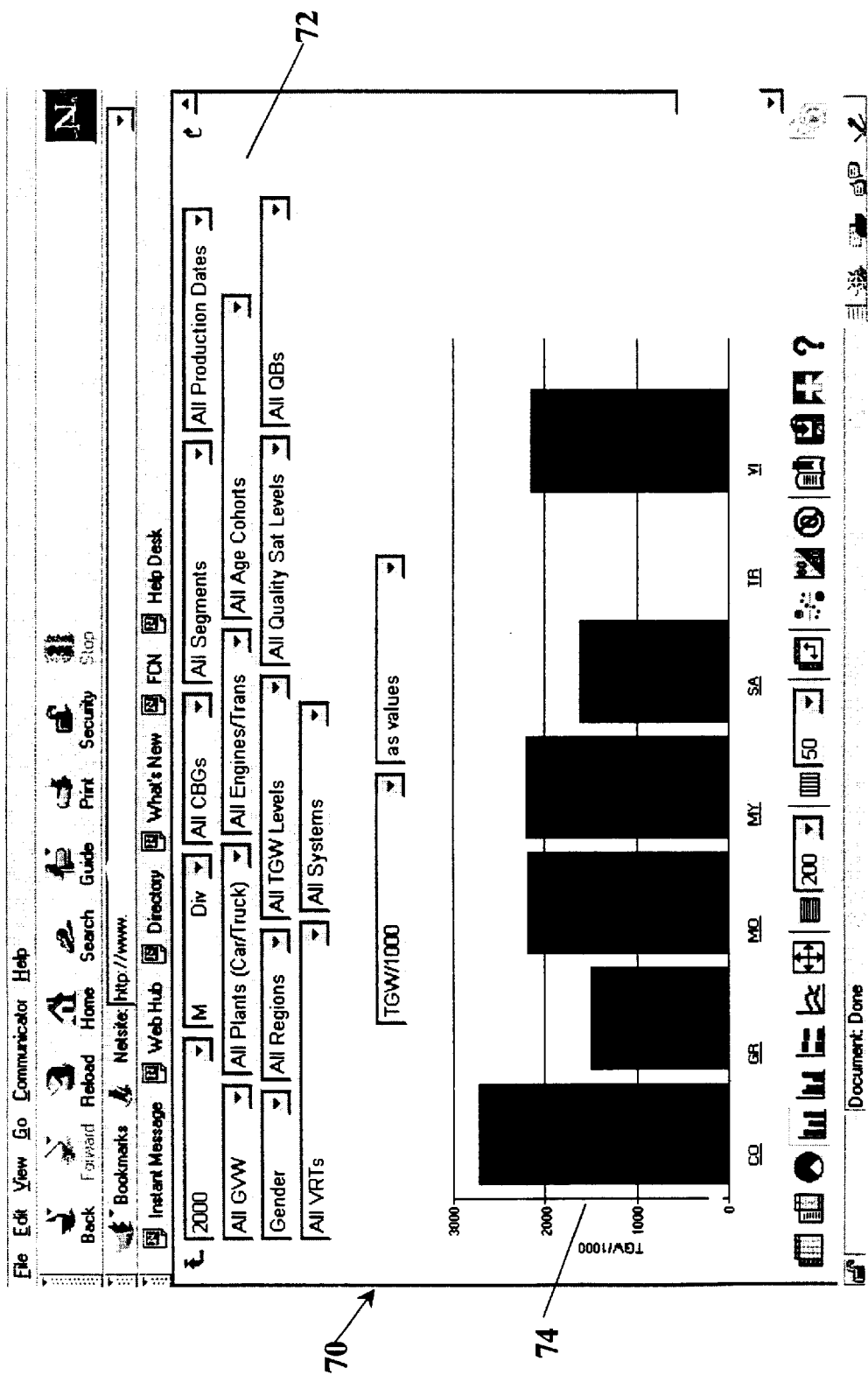
Figure 5D:
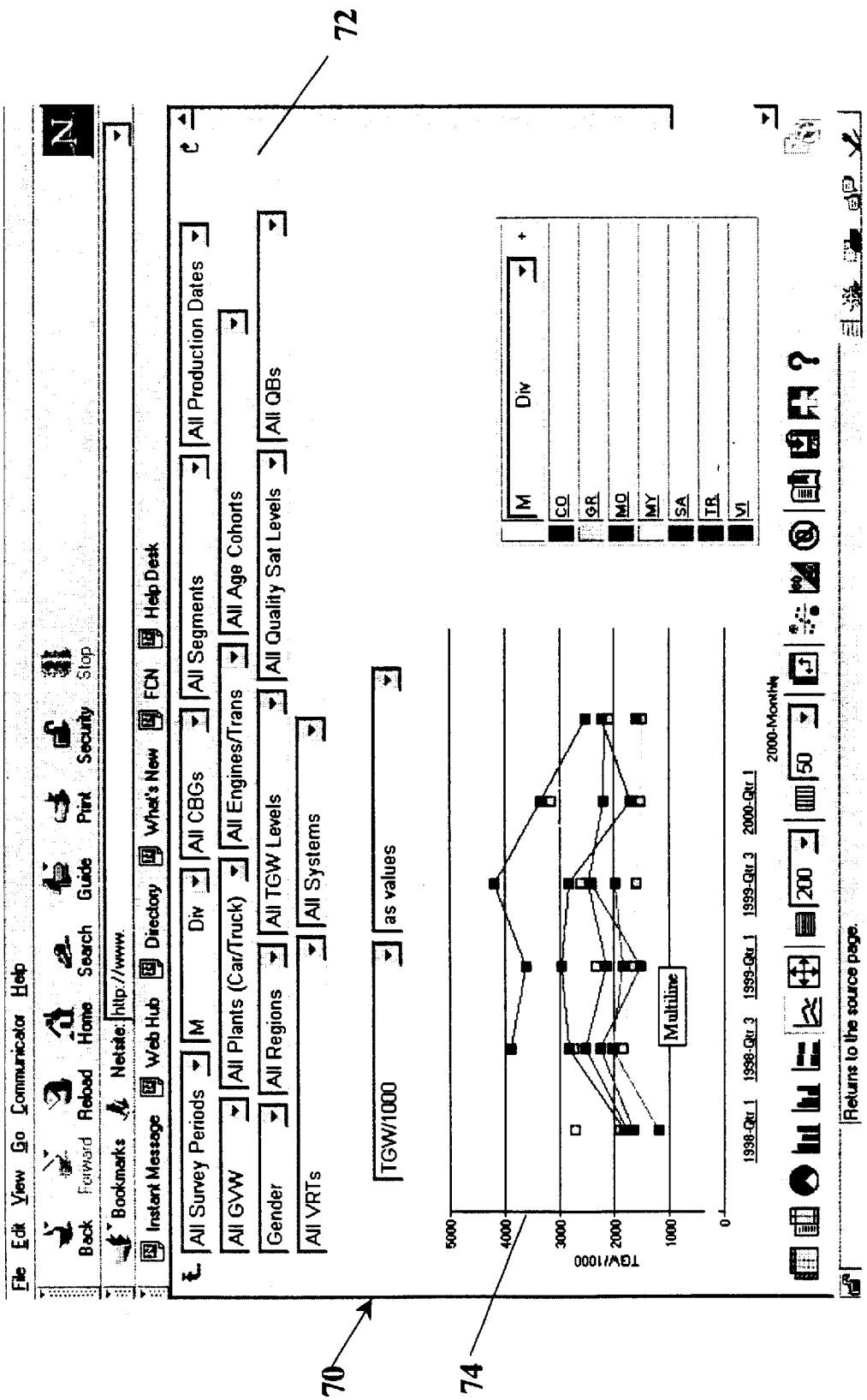

Referring now to FIGS. 5a, 5b, 5c, and 5d, a graphical user interface 70 for displaying the query results stored in the data cube 32 are illustrated, in accordance with the present invention. Preferably, the graphical user interface uses software developed by Cognos Incorporated of Ottawa, ON Canada. Graphical user interface 70 has a plurality of query fields 72 and a query results window 74. The query fields 72 were originally specified during the building of the transformer 30. These query fields, preferably have pull-down menus which allow the user to limit in a specific way the information retrieved. In this way, a user may manipulate the plurality of query fields 32 to analyze a specific set of product performance data. Once the user has selected the query the results of the query are displayed in the results window 74. The results of the queries may be displayed in tabular form (FIG. 5a), graphical form including pie charts (FIG. 5b), bar charts (FIG. 5c) or line charts (FIG. 5d).

The advantages and benefits of the present invention are many. For example, the database queries are pre-processed allowing shorter analysis time.

Further, the graphical user interface provides a variety of ways to view the results of a database query.

While the best mode for carrying out the invention has been described in detail, those familiar with the art to which this invention relates will recognize various alternative designs and embodiments for practicing the invention as defined by the following claims.

What is claimed is:

1. A method for analyzing product performance relational data, the method comprising:
   selecting one or more database queries from a set of preselected database queries by selecting one or more predefined relational database fields containing the product performance relational data;
   creating one or more transformer model(s) based on the selected field(s) wherein the transformer model(s) define one or more database queries to be processed;
   processing one or more of the transformer model(s) to create one or more multi-dimensional database structures that include at least a portion of the product performance data resulting from the one or more selected queries; and
   displaying a result of the database query derived from a pre-processed set of database queries on the one or more multi-dimensional database structures.

2. The method of claim 1 wherein the pre-processed set of database queries is an online analytical processing data cube.

3. The method of claim 1 wherein displaying a result further comprising displaying a graphical user interface for providing a user with a means to analyze the product performance relational data.

4. The method of claim 1 further comprising displaying the result of the database query via an Internet website.

5. The method of claim 1 wherein the product performance relational data is warranty data.

6. The method of claim 1 wherein the product performance relational data is market research data.

7. The method of claim 1 wherein the product performance relational data is product concern data.

8. The method of claim 1 wherein the product performance relational data is product quality data.

9. A system for analyzing product performance relational data, the system comprising one or more computers operably programmed and configured to:

receive input selecting one or more database queries from a set of preselected database queries wherein one or more predefined relational database fields containing the product performance relational data are selected;

create one or more transformer model(s) based on the selected field(s) wherein the transformer model(s) define one or more database queries to be processed;

process one or more of the transformer model(s) to create one or more multidimensional database structures that include at least a portion of the product performance data resulting from the one or more selected queries; and display a result of the database query derived from a pre-processed set of database queries on the one or more multi-dimensional database structures.

10. The system of claim 9 wherein the pre-processed set of database queries is an online analytical processing data cube.

11. The system of claim 9 wherein the one or more computers are additionally programmed and configured to display a graphical user interface including a means for enabling a user to analyze the product performance relational data.

12. The system of claim 9 wherein the result of the database query is displayed via an Internet website.

13. The system of claim 9 wherein the product performance relational data is warranty data.

14. The system of claim 9 wherein the product performance relational data is market research data.

15. The system of claim 9 wherein the product performance relational data is product concern data.

16. The system of claim 9 wherein the product performance relational data is product quality data.

* * * * *